US005426970A

United States Patent [19]
Florida et al.

[11] Patent Number: 5,426,970
[45] Date of Patent: Jun. 27, 1995

[54] ROTATION RATE SENSOR WITH BUILT IN TEST CIRCUIT

[75] Inventors: Alvin V. Florida; Piyush K. Gupta, both of Antioch; David F. Macy, Mission Viejo; Harold D. Morris, Orinda, all of Calif.

[73] Assignee: New SD, Inc., Concord, Calif.

[21] Appl. No.: 100,759

[22] Filed: Aug. 2, 1993

[51] Int. Cl.⁶ .................... G01P 15/09; G01P 21/00; H01L 41/107
[52] U.S. Cl. .................... 73/1 D; 73/517 A; 73/517 AV; 73/517 R; 310/316; 310/370
[58] Field of Search .................... 73/1 D, 505, 517 R, 73/517 A, 517 AV; 310/316, 317, 370

[56] References Cited

U.S. PATENT DOCUMENTS

| | | |
|---|---|---|
| Re. 32,931 | 5/1989 | Staudte . |
| Re. 33,479 | 12/1990 | Juptner et al. ........................ 73/505 |
| 4,538,461 | 9/1985 | Juptner . |
| 4,628,734 | 12/1986 | Watson ............................... 73/505 |
| 4,654,663 | 3/1987 | Alsenz . |
| 4,898,032 | 2/1990 | Voles .................................. 73/505 |
| 4,899,587 | 2/1990 | Staudte ............................... 73/505 |
| 4,930,351 | 6/1990 | Macy . |
| 5,056,366 | 10/1991 | Fersht . |

FOREIGN PATENT DOCUMENTS

| | | |
|---|---|---|
| 228915 | 11/1985 | Japan .................................. 73/505 |
| 164109 | 7/1986 | Japan .................................. 73/505 |

*Primary Examiner*—Hezron E. Williams
*Assistant Examiner*—Daniel S. Larkin
*Attorney, Agent, or Firm*—Flehr, Hohbach, Test, Albritton & Herbert

[57] ABSTRACT

A rotation rate sensor which employs a built-in (i.e. internal) test circuit. The rotation rate sensor includes a piezoelectric structure. Deposited on the piezoelectric structure are at least two pickup high and two pickup low electrodes. A pickup circuit is coupled to the pickup high and pickup low electrodes. During a normal mode of operation, the piezoelectric structure is subject to a rotation about one of its axis. In response, the pickup circuit generates a rate signal which corresponds to the rotation rate of the piezoelectric structure. The test circuit is coupled to the pickup low electrodes. During a test mode of operation, the piezoelectric structure is also subject to a rotation about the axis. But, the test circuit generates at the same time a test signal which is provided to the pickup low electrodes and which corresponds to a pseudo rate of rotation. In response, the pickup circuit generates a rate signal which corresponds to the sum of the actual rate of rotation of the piezoelectric material plus the pseudo rate of rotation.

49 Claims, 6 Drawing Sheets

ROTATION RATE SENSOR WITH BUILT IN TEST CIRCUIT

The present invention relates generally to the testing of rotation rate sensors. In particular, it pertains to a test circuit built into a rotation rate sensor.

The present application is also related to the copending, concurrently filed, and commonly assigned U.S. Patent Application entitled "Rotation Rate Sensor with Center Mounted Tuning Fork", Ser. No. 08/100,760, by P. Gupta and C. Jenson. This application is expressly incorporated herein.

Current approaches for testing rotation rate sensors rely on testers which are externally hooked up to the rotation rate sensor by the manufacturer. However, these testers are complex, costly, and are used only under simulated conditions. Furthermore, these testers do not enable the eventual buyer or user to test the performance of the rotation rate sensor during actual operation.

It is therefore an object of the invention to provide a rotation rate sensor which allows a user to test the performance of the rotation rate sensor during actual operation and allows the manufacturer to test it under simulated conditions.

It is also an object of the invention to provide a simple and inexpensive way of testing a rotation rate sensor.

The foregoing and other objects of the invention are achieved by a rotation rate sensor which employs a built-in (i.e. internal) test circuit. The rotation rate sensor includes a piezoelectric structure. Deposited on the piezoelectric structure are at least two pickup high and two pickup low electrodes. A pickup circuit is coupled to the pickup high and pickup low electrodes. During a normal mode of operation, the piezoelectric structure is subject to a rotation about one of its axis. In response, the pickup circuit generates a rate signal which represents the rotation rate of the piezoelectric structure. The test circuit is coupled to the pickup low electrodes. During a test mode of operation, the piezoelectric structure may or may not be subject to a rotation about the axis. But, the test circuit generates at the same time a test signal which is provided to the pickup low electrodes and which corresponds to a pseudo (i.e. simulated) rate of rotation. In response, the pickup circuit generates a rate signal which represents the sum of the actual (i.e. inertial) rate of rotation of the piezoelectric material plus the pseudo rate of rotation.

Figure 1:
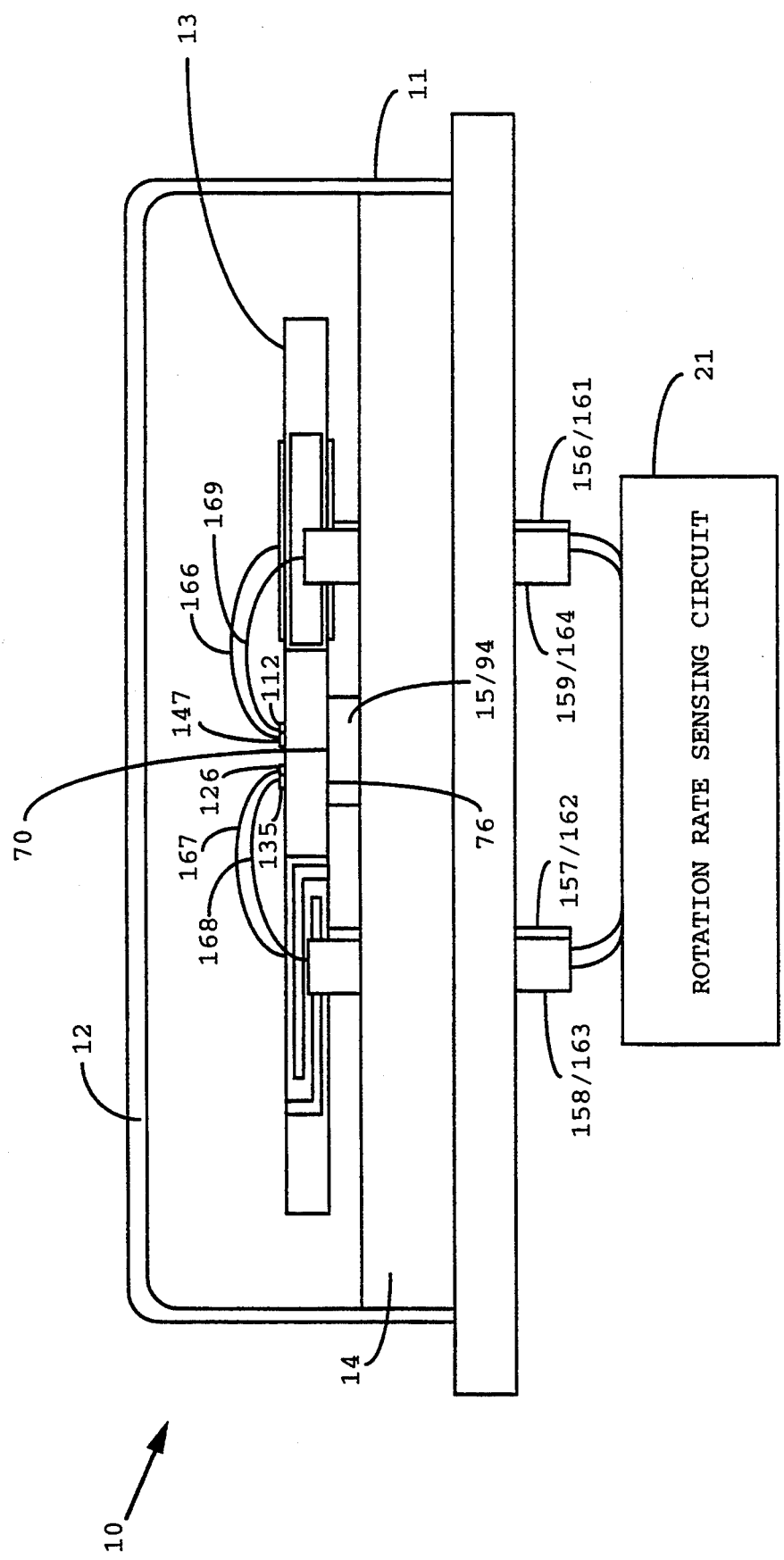
FIG. 1 is a cross sectional view of a rotation rate sensor in accordance with the present invention.

Referring initially to FIG. 1, the rotation rate sensor 10 comprises a housing 11, a double ended (i.e. H-shaped) tuning fork 13, and a rotation rate sensing circuit 21. The housing includes a lid 12, a base 14, and a mounting structure 15.

In the preferred embodiment, the mounting structure 15 is a pedestal 94 to which the tuning fork 13 is mounted. The mounting surface 76 of pedestal 94 is fixed to the single exclusive mounting surface 70 of the mounting base 57. This may be done with any conventional thermal plastic adhesive or epoxy. Thus, the tuning fork 13 is mounted within the housing 11 only at the single exclusive mounting surface 70.

Figure 2:
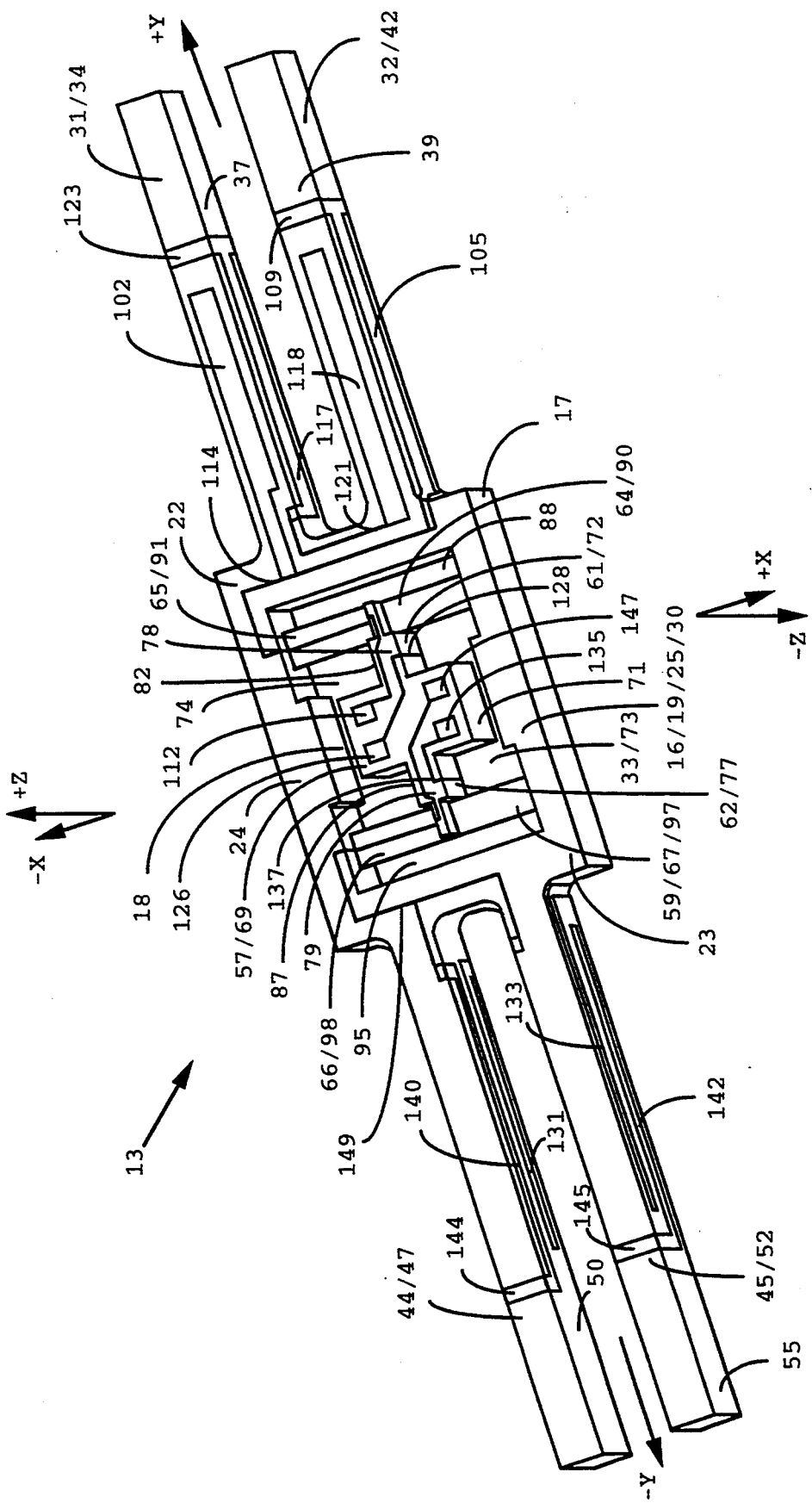
FIG. 2 is a three dimensional view of the top of the double ended tuning fork of the rotation rate sensor shown in FIG. 1.
Figure 3:
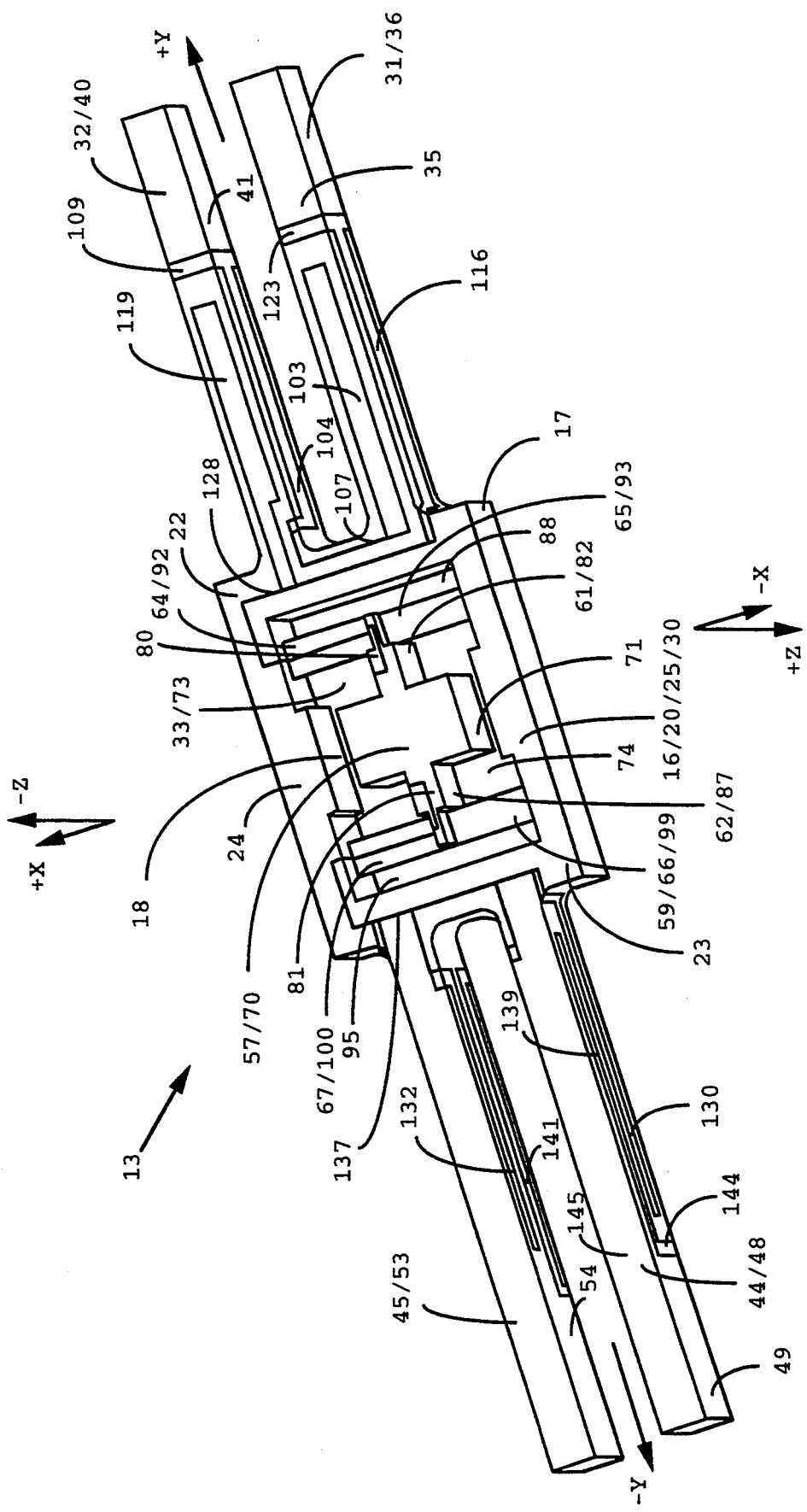
FIG. 3 is a three dimensional view of the bottom of the double ended tuning fork of the rotation rate sensor shown in FIG. 1.

The tuning fork 13 is etched from a single crystal of a piezoelectric material. This material may be quartz, Lithium Niobate, or some other piezoelectric substance. The orientation of the tuning fork 13 is defined by the X, Y, and Z axes shown in FIGS. 2 and 3. These axes correspond to the alignment of the molecular structure of the crystal. As is illustrated by the two figures, the tuning fork 13 is oriented in the XY plane.

Referring back to FIGS. 2 and 3, the suspension system 59 joins the mounting base 57 to the body 16. In doing so, the suspension system 59 enables the drive tines 31 and 32 to properly experience time-varying Coriolis acceleration in equal and opposite directions when the tuning fork 13 is subjected to a rotation about the Y axis. Furthermore, the suspension system 59 allows the torque transfer limbs 24 and 25 of the body 16 to properly couple to the pickup tines 44 and 45 the time-varying torsion experienced by the body 16 and created by the time-varying Coriolis accelerations.

The cross bridges 61 and 62 of the suspension system 59 are each joined to the mounting base 57. The cross bridge 61 extends from the mounting base 57 in the +Y direction between the openings 73 and 74. However, the cross bridge 62 extends from the mounting base 57 in the −Y direction between the openings 73 and 74. The cross bridge 61 has front surface 78, back surface 80, and side surfaces 72 and 82. The cross bridge 62 has front surface 79, back surface 81, and side surfaces 77 and 87. The surfaces 78–81 each lie in a plane parallel to the XY plane while the surfaces 72, 77, 82, and 87 are perpendicular to the XY plane. Thus, the cross bridges 61 and 62 are oriented in the XY plane.

The thin suspension bridges 64 and 65 of the suspension system 59 are each joined to the cross bridge 61 and to the internal perimeter surface 18 of the body 16. As shown, the thickness of the suspension bridges 64 and 65 is considerably less than the thickness of the cross bridge 61. The suspension bridge 64 extends from the cross bridge 61 to the internal perimeter surface 18 in the +X direction between the openings 73 and 88. However, the suspension bridge 65 extends from the cross bridge 61 to the internal perimeter surface 18 in the −X direction between the openings 74 and 88. The suspension bridges 64 and 65 respectively have front surfaces 90 and 91 and back surfaces 92 and 93 which each lie in a plane parallel to the XY plane. Thus, the suspension bridges 64 and 65 are oriented in the XY plane.

The thin suspension bridges 66 and 67 of the suspension system 59 are each joined to the cross bridge 62 of the tuning fork 13 and to the internal perimeter surface 18 of the body 16. The thickness of the suspension bridges 66 and 67 is considerably less than the thickness of the cross bridge 62. The suspension bridge 67 extends from the cross bridge 62 to the internal perimeter surface 18 in the +X direction between the openings 73 and 95. However, the suspension bridge 66 extends from the cross bridge 62 to the internal perimeter surface 18 in the −X direction between the openings 74 and 95. The suspension bridges 66 and 67 respectively have front surfaces 97 and 98 and back surfaces 99 and 100 which each lie in a plane parallel to the XY plane. Thus, the suspension bridges 66 and 67 are oriented in the XY plane.

The pair of drive high electrodes 102 and 103 of drive tine 31 are respectively located on the surfaces 34 and 35 of drive tine 31. The pair of drive high electrodes 104 and 105 of drive tine 32 are respectively located on the side surfaces 41 and 42 of drive tine 32.

The electrode 103 of drive tine 31 is coupled to the electrode 104 of drive tine 32 by the lead 107. Portions of the lead 107 are disposed on the back surface 20 of the body 16 and the back surface 40 of the drive tine 32.

The electrodes 104 and 105 of drive tine 32 are coupled together by the lead 109. The lead 109 is disposed respectively on the front, back, and side surfaces 39, 40, 41, and 42 of drive tine 32.

The electrodes 102 and 105 are coupled to each other and to the drive high contact pad 112 by the lead 114. The contact pad 112 is disposed on the front surface 69 of the mounting base 57. Portions of the lead 114 are disposed on the front surface 19 of the body 16, the front surface 91 of suspension bridge 65, the side and front surfaces 82 and 78 of cross bridge 61, and the front surface 69 of the mounting base 57.

From the foregoing it is clear that the electrodes 102–105 are coupled together by the leads 107, 109, and 114. As a result, the lead 114 provides the electrodes 102–105 with the same signal.

The pair of drive low electrodes 116 and 117 of drive tine 31 are respectively located on the side surfaces 36 and 37 of drive tine 31. The pair of drive low electrodes 118 and 119 of drive tine 32 are respectively located on the front and back surfaces 39 and 40 of drive tine 32.

The electrode 118 of drive tine 32 is coupled to the electrode 117 of drive tine 31 by the lead 121. Portions of the lead 121 are disposed on the front surface 19 of the body 16 and the front surface 34 of the drive tine 31.

The electrodes 116 and 117 of drive tine 31 are coupled together by the lead 123. The lead 123 is disposed respectively on the front, back, and side surfaces 34, 35, 36, and 37 of drive tine 31.

The electrodes 116 and 119 are coupled to each other and to the drive low contact pad 126 by the lead 128. The contact pad 126 is disposed on the front surface 69 of mounting base 57. Portions of the lead 128 are disposed on the back surface 20 of the body 16, the back surface 92 of suspension bridge 64, the back, side, and front surfaces 80, 72, and 78 of cross bridge 61, and the front surface 69 of the mounting base 57.

Thus, the electrodes 116–119 are coupled together by the leads 121, 123, and 128. As a result, the lead 128 provides the contact pad 126 with a signal which is a summation of the signals received from the electrodes 116–119.

The pair of pickup high electrodes 130 and 131 of pickup tine 44 are respectively located on the side surfaces 49 and 50 of pickup tine 44. The pair of pickup high electrodes 132 and 133 of pickup tine 45 are respectively located on the side surfaces 54 and 55 of pickup tine 45.

The electrodes 130–133 are each coupled to the pickup high contact pad 135 by the lead 137. The contact pad 135 is disposed on the front surface 69 of the mounting base 57. Portions of the lead 137 are disposed on the back surface of body 16, at the junction of the side surface 49 of pickup tine 44 and the external perimeter surface 17 of the body 16, at the junction of the side surface 55 of pickup tine 45 and the external perimeter surface 17 of the body 16, on the back surface 48 of pickup tine 44, on the back surface 53 of pickup tine 45, on the back surface 100 of suspension bridge 67, on the back, side, and front surfaces 81, 77, and 79 of cross bridge 62, and the front surface 69 of mounting base 57. As a result, the lead 137 provides the contact pad 135 with a signal which is a summation of the signals received from the electrodes 130–133.

The pair of pickup low electrodes 139 and 140 of pickup tine 44 are respectively located on the side surfaces 49 and 50 of pickup tine 44. The pair of pickup low electrodes 141 and 142 of pickup tine 45 are respectively located on the side surfaces 54 and 55 of pickup tine 45.

The electrodes 139 and 140 are each coupled together by the lead 144. The lead 144 is disposed on the front and side surfaces 47, 49, and 50 of pickup tine 44.

The electrodes 141 and 142 are each coupled together by the lead 145. The lead 145 is disposed on the front, side, and back surfaces 52, 54, and 55 of pickup tine 45.

The electrodes 140 and 141 are coupled to the pickup low contact pad 147 by the lead 149. The contact pad 147 is disposed on the front surface 69 of the mounting base 57. Portions of the lead 149 are disposed on the front surface 47 of pickup tine 44, the front surface 52 of pickup tine 45, the front surface 19 of body 16, on the front surface 98 of suspension bridge 66, on the side and front surfaces 87 and 79 of cross bridge 62, and the front surface 69 of mounting base 57.

Thus, the electrodes 139–142 are coupled together by the leads 144, 145, and 149. As a result, lead 149 provides the pickup electrodes 139–142 with the same signal.

All of the described electrodes, leads (i.e. traces), and contact (i.e. wirebonding) pads may be formed from vapor deposition of gold. The deposited gold may be trimmed by use of conventional photolithographic techniques and by use of aperture masks.

Figure 4:
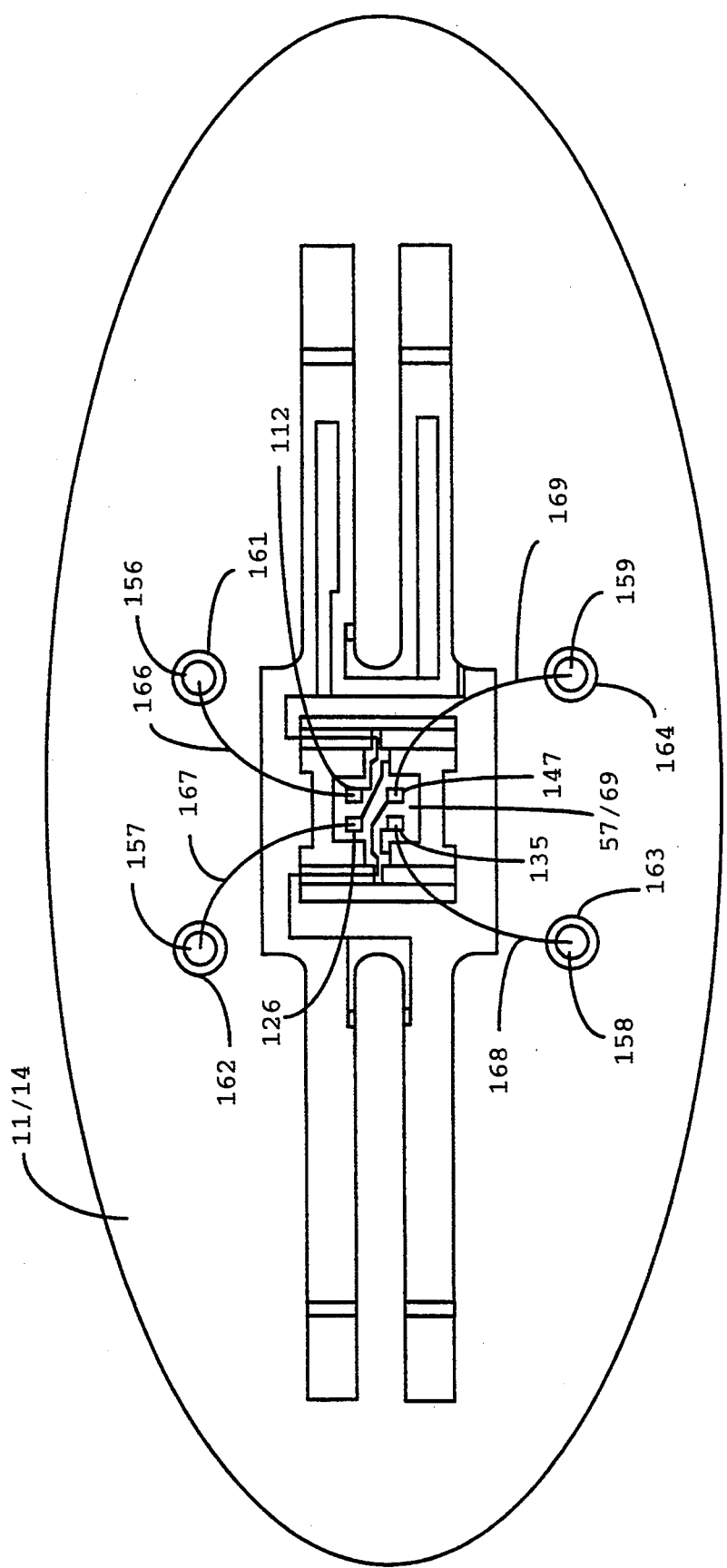
FIG. 4 is a top view of the tuning fork mounted to the base of the sensor housing.

As shown in FIG. 4, the base 14 of the housing 11 includes the drive high feedthrough 156, the drive low feedthrough 157, the pickup high feedthrough 158, and the pickup low feedthrough 159. The feedthroughs 156–159 are respectively surrounded by the insulating rings 161–164 so as to form hermetic and electrically insulating seals. The material used for the feedthroughs 156–159 is chosen with respect to the material of the base 14 of the housing 11. For example, if the base 14 is made of the Nickel Alloy Monel 400, the feedthroughs 156–159 are made of iron-nickel alloy 52. The insulating rings may be any insulating material including glass.

The back surface 70 of the mounting base 57 is mounted to the pedestal 15 and the surface 69 of the base 57 and the contact pads 112, 126, 135, and 147 are exposed. The feedthroughs 156–159 are respectively coupled to the contact pads 112, 126, 135, and 147 by the wirebonds 166–169. The material used for the wirebonds 166–169 is gold wire. As shown in FIG. 1, the feedthroughs 156–159 are coupled to the rotation rate sensing circuit 21 of the rotation rate sensor 10.

Figure 5:
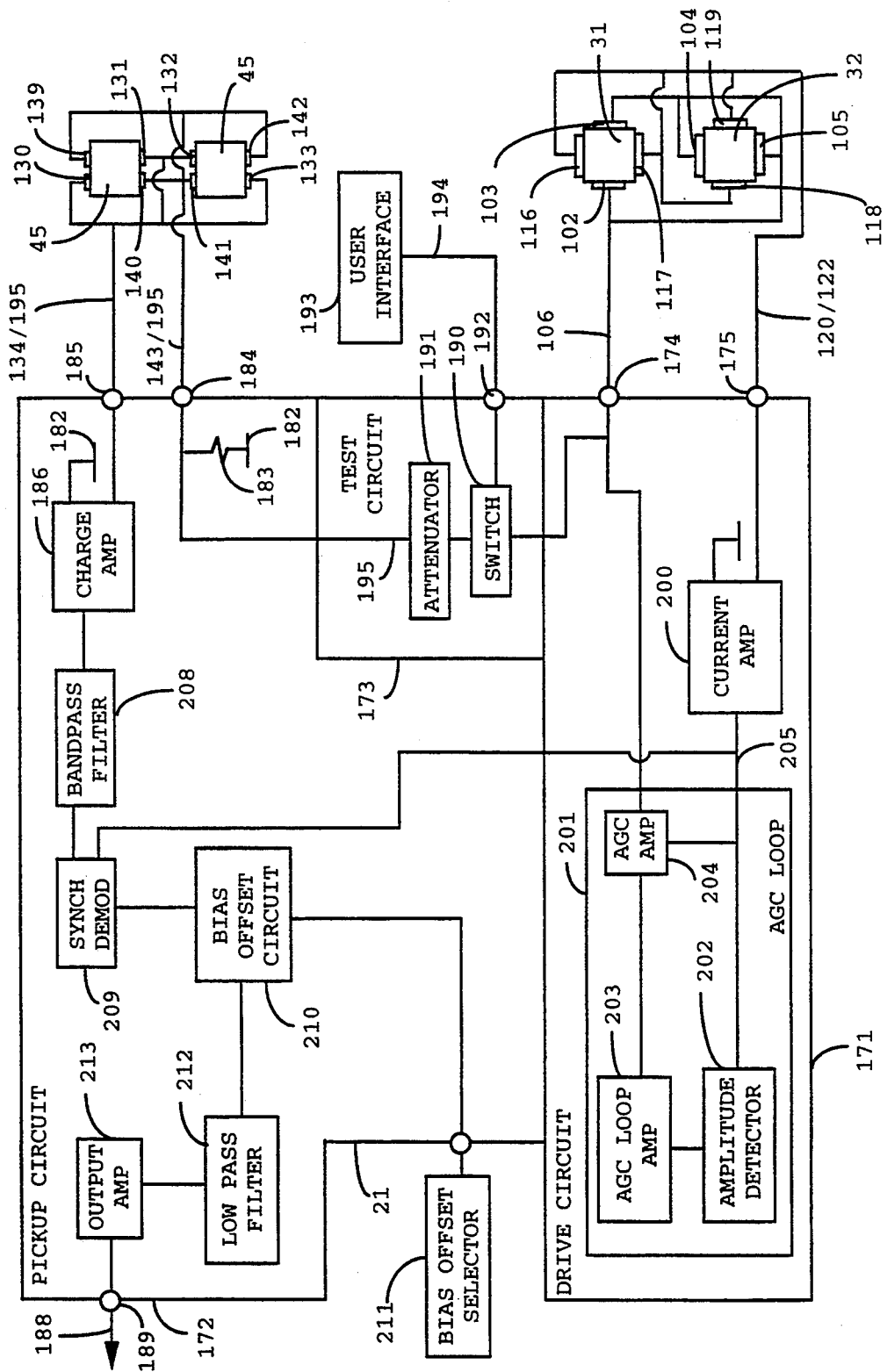
FIG. 5 is a diagram of the rotation rate sensing circuit of the rotation rate sensor shown in FIG. 1.

As shown in FIG. 5, the sensing circuit 21 includes a drive circuit 171, a pickup circuit 172, and a built-in test circuit 173. The drive circuit 171 is of the type well known in the art. The pickup circuit 172 is also well known in the art except for several modifications.

The drive circuit 171 includes a current amplifier 200 and an automatic gain control (AGC) loop 201. The AGC loop includes an amplitude detector 202, an automatic gain control (AGC) loop amplifier 203, and an automatic gain control (AGC) amplifier 204.

As is well known in the art, the AGC amplifier 203 produces a sinusoidal drive high output signal 106 which is outputted by the output terminal 174 of the drive circuit 171. The drive high signal 106 is sent from the output terminal 174 to the drive high electrodes 102–105. This is done via the drive high feedthrough 156, the drive high wirebond 166, the drive high contact pad 112, and the leads 107, 109, and 114 (not shown). The drive high electrodes then apply the drive high signal 106 to the drive tines 31 and 32.

The drive circuit 171 provides a virtual ground 122 to the output terminal 175 of the drive circuit 171. The virtual ground is then provided to the drive low electrodes 116–119 via the drive low feedthrough 157, the drive low wirebond 167, the drive low contact pad 126, and the leads 121, 123, and 128 (not shown). The virtual ground 122 is applied to the drive tines 31 and 32 by the electrodes 116–119.

As is well known in the art, the drive high signal 106 and the virtual ground 122 applied to the drive tines 31 and 32 cause strains in the piezoelectric material of the drive tines 31 and 32. These strains induce the drive tines 31 and 32 to vibrate generally in opposite directions in the XY plane at their resonant frequency. This is known as the drive mode. The frequency of the drive mode of tuning fork 13 is approximately 10,860 Hz.

In response to this vibration, the drive circuit receives a drive low signal 120 at the terminal 175 from the drive low electrodes 116–119. This is done via the drive low feedthrough 157, the drive low wirebond 167, the drive low contact pad 126, and the leads 121,123, and 128 (not shown).

The current amplifier 200 receives the drive low signal 120. In response, it amplifies this signal and outputs a current signal 205 whose current is proportional to the amplitude of vibration of the drive tines 31 and 32 in the drive mode.

The current signal 205 is then provided to the amplitude detector 202 and the AGC amplifier 204 of the AGC loop 201. The amplitude detector 202 rectifies the current signal 205 and provides this rectified signal to the AGC loop amplifier 203. In response, the AGC loop amplifier 203 provides a signal which controls the AGC amplifier 204 to generate the drive high signal 106 to keep the amplitude of vibration of the drive tines fixed. The voltage of the drive high signal 106 is therefore proportional to the amplitude of the vibration of the drive tines 31 and 32 and is also temperature compensated.

During the normal mode of operation of the rotation rate sensor 10, the tuning fork 13 is subject to an actual (i.e. inertial) rotation about the Y axis. In response, the drive tines 31 and 32 experience generally equal but opposing Coriolis accelerations in planes parallel to the YZ plane. These time-varying accelerations cause the drive tines 31 and 32 to vibrate out of the XY plane at the resonant frequency of the drive mode. As a result, the Coriolis accelerations of the drive tines 31 and 32 in the planes parallel to the YZ plane are in phase with the velocity of the drive tines 31 and 32 in the XY plane.

Because of the opposing time-varying accelerations, the body 16 of the tuning fork 13 will experience a time-varying torsion. This time-varying torsion is coupled to the pickup tines 44 and 45 and causes them to vibrate generally in opposite directions in planes parallel to the YZ plane. This vibration takes place at the same frequency at which the drive tines 31 and 32 vibrate. The suspension system 59 enables the time-varying torsion to be properly coupled to the pickup tines 44 and 45.

When the pickup tines 44 and 45 vibrate or deflect generally in opposite directions in planes parallel to the YZ plane, this is known as the pickup mode. In the absence of Coriolis induced accelerations, the pickup tines 44 and 45 may vibrate at their normal resonant frequency in the pickup mode. The resonant frequency of the pickup mode is approximately 11,390 Hz. However, as was suggested earlier, in the presence of Coriolis accelerations, the pickup tines 44 and 45 are forced to vibrate in the pickup mode at the frequency at which the drive tines 31 and 32 vibrate.

The pickup circuit 172 of the rotation rate sensing circuit 21 includes a resistor 183. The resistor 183 is coupled to the pickup low output terminal 184 of the pickup circuit 172 and to ground 182. In the preferred embodiment, the resistor 183 has a resistance of approximately 100 ohms. This resistance is small enough so that during the normal mode of operation, the output terminal 184 is provided only with a ground 143. As a result, during the normal mode, the pickup low electrodes 139–142 receive only the ground 143. This is done via the pickup low feedthrough 159, the pickup low wirebond 169, the pickup low contact pad 147, and the leads 144, 145, and 149 (not shown).

As is well known in the art, when the pickup tines 44 and 45 vibrate, the strains imposed on the piezoelectric material of the pickup tines 44 and 45 cause oscillating electric field gradients to be generated in the pickup tines 44 and 45. In response, the pickup high electrodes 130–133 together pickup an oscillating rotation (or normal pickup high) signal 134. The rotation signal 134 represents the summed together time-varying strains experienced by the pickup tines 44 and 45 and corresponds to the actual rate of rotation of the tuning fork 13 and to the actual pickup mode vibration or deflection of the pickup tines 44 and 45. The rotation signal 134 is provided by the electrodes 130–133 to the pickup high input terminal 185 of the pickup circuit 172. This is done via the pickup high feedthrough 158, the pickup high wirebond 168, the pickup high contact pad 135, and the lead 137 (not shown).

The charge amplifier 186 of the pickup circuit 172 has one input directly coupled to the input terminal 185 of the pickup circuit and the other input is directly coupled to ground 182. Thus, unlike the prior art pickup circuits, the charge amplifier 186 is not directly coupled to the output terminal 184 of the pickup circuit 172.

In response to receiving the rotation signal 134, the charge amplifier 186 amplifies the signal and provides it to the bandpass amplifier 208. The bandpass amplifier 208 filters and amplifies the signal it receives from the charge amplifier 186 and provides this signal to the demodulation electronics 209.

The demodulation electronics 209 demodulates the signal it receives from the bandpass filter 208 with respect to the current signal 205 it also receives. In the normal mode of operation, the demodulated signal generated by the demodulation electronics 209 is proportional to the magnitude of the component of the pickup high signal 134 which is proportional to the applied actual rate of rotation and to the Coriolis accelerations experienced by the drive tines 31 and 32 of the tuning fork 13 and to the actual amplitude of the pickup mode vibration or deflection of the pickup tines 44 and 45.

The demodulated signal is then provided to the bias offset circuit 210. The bias offset selector 211 is used by a user of the rotation rate sensor 10 to control the amount of bias which is trimmed from the demodulated signal by the bias offset circuit 210.

The bias trimmed signal is then provided to the low pass filter 212. The low pass filter 212 filters out any residual high frequency components and provides the filtered signal to the output amplifier 213.

The output amplifier 213 amplifies this signal and outputs it as the rate signal 188 at the output terminal 189. During the normal mode of operation, the rate signal 188 corresponds to the actual rate of rotation of the tuning fork 13. Like the demodulated signal produced by the demodulation electronics 209, the rate signal is proportional to the magnitude of the component of the pickup high signal 134 which is proportional to the applied actual rate of rotation and to the Coriolis accelerations experienced by the drive tines 31 and 32 of the tuning fork 13 and to the actual amplitude of the actual pickup mode vibration or deflection of the pickup tines 44 and 45.

The rotation rate sensing circuit 21 also has a test mode which enables a user to test the rotation rate sensor 10 during actual operation. In other words, during the test mode the tuning fork 13 may be subject to an actual rotation about the Y axis while the user is using the rotation rate sensor 10. This test mode is activated by the user with the built-in test circuit 173.

The test circuit 173 includes a switch 190 and an attenuator 191. Additionally, the test circuit includes a test command input terminal 192 which is coupled to a user interface 193. When a user desires to test the operation of the rotation rate sensor 10, the user selects the test mode with the user interface 193. In response, the user interface 193 generates a test command signal 194 which is provided to the input terminal 192.

The switch 190 has an input coupled to the output terminal 174 of the drive circuit, an output coupled to the input of the attenuator 191, and another input coupled to the test command input terminal 192. When the switch receives the test command signal 194, it provides the drive high signal 106 generated by the drive circuit 171 to the attenuator 191.

The output of the attenuator 191 is coupled to the pickup low output terminal 184 of the pickup circuit 172 and therefore also to the resistor 183. The attenuator 191 attenuates the drive high signal 106 received from the switch 190 and provides it as a test signal 195 to the output terminal 184.

Alternatively, the switch 191 and the attenuator 190 can be switched. In this configuration, the input of the attenuator 191 will be coupled to the output terminal 174 of the drive circuit 171 and the output of the attenuator 191 will be coupled to one of the inputs of the switch 190.

The other input of the switch 190 is still coupled to the test command input terminal 192. However, the output of the switch 190 is coupled to the output terminal 184 of the pickup circuit 172. As a result, the attenuator attenuates the drive high signal 106 before it reaches the switch 190. If the switch 190 receives the test command signal 194 from the test command input terminal 192, then the switch 190 provides the attenuated drive high signal 106 to the output terminal 184.

In the configuration of FIG. 5, the output terminal of the AGC amplifier 204 is coupled to the switch 190. As was suggested earlier, the drive high signal 106 generated by the AGC amplifier 204 has a voltage that is proportional to the amplitude of the vibration. Thus, in this case, the test signal 195 has a voltage which is proportional to this amplitude of vibration as well.

As was indicated earlier, in the preferred embodiment, the resistance of the resistor 183 is approximately 100 ohms. This is large enough to force the test signal 195 to be put out by the output terminal 184 during the test mode of operation while still enabling the output terminal 184 to output the ground 143 during the normal mode of operation.

During the test mode, the test signal 195 is provided to the pickup low electrodes 139-142 via the pickup low feedthrough 159, the pickup low wirebond 169, the pickup low contact pad 147, and the leads 144,145, and 149 (not shown). The pickup low electrodes 139 and 140, the pickup high electrodes 130 and 131, and the piezoelectric material of the pickup tine 44 form a capacitance associated with the pickup tine 44.

The pickup low electrodes 141 and 142, the pickup high electrodes 132 and 133, and the piezoelectric material of the pickup tine 45 form a capacitance associated with the pickup tine 45.

When the sinusoidal test signal 195 is received by the pickup low electrodes 139 and 140, these electrodes are capacitively coupled to the pickup high electrodes 130 and 131 by the capacitance associated with the pickup tine 44. When the sinusoidal test signal 195 is received by the pickup low electrodes 141 and 142, these electrodes are capacitively coupled to the pickup high electrodes 132 and 133 by the capacitance associated with the pickup tine 45. As a result, the pickup high electrodes 130-133 together pickup the test signal 195 from the pickup tines 44 and 45 which therefore corresponds to a pseudo pickup mode vibration or deflection of the pickup tines 44 and 45.

As was suggested earlier, the rotation rate sensor 10 may be in actual operation when the test signal 195 is generated. If this is the case, the tuning fork 13 will experience an actual rate of rotation about the Y axis during the test mode. Thus, the pickup high electrodes 130-133 will pickup the earlier described rotation signal 134 at the same time that they pickup the test signal 195. The combined signals 134 and 195 are then provided to the pickup high input terminal 185 of the pickup circuit 172 via the pickup high feedthrough 158, the pickup high wirebond 168, the pickup high contact pad 135, and the lead 137.

The combined signals 134 and 195 are processed by the pickup circuit 172 in the same way as was described earlier for just the rotation signal 134 during the normal mode of operation. However, in this case, the magnitude of the rate signal 188 outputted by the electronics 187 will represent the sum of the actual rate of rotation experienced by the tuning fork 13 and a constant pseudo (i.e. simulated) rate of rotation. In other words, the rate signal 188 represents the sum of the actual amplitude of the actual pickup mode vibration or deflection of the pickup tines 44 and 45 and the pseudo amplitude of the pseudo pickup mode vibration or deflection of the pickup tines 44 and 45 and will have a component that corresponds to the actual rate of rotation and a constant component that corresponds to the pseudo rate of rotation. The component corresponding to the actual rate of rotation is due to the rotation signal 134 while the constant component corresponding to the pseudo rate of rotation is due to the test signal 195.

The attenuator 191 is calibrated so that the constant pseudo rate of rotation described above is a predefined value when the test signal 195 is generated in the test mode. A user can therefore test the sensor 10 in the following manner. First, the rate of rotation represented by the magnitude of the rate signal 188 is observed during the normal mode of operation. Then, the user activates the test mode with the user interface 193. If the magnitude of the entire rate signal 188 changes by an amount within a specified tolerance of the predefined value of the constant pseudo rate of rotation, then the sensor 10 is operating correctly. However, if the magnitude of the rate signal 188 does not change by an amount within the specified tolerance, then the sensor 10 is not functioning properly.

In the preferred embodiment, the attenuator 191 is a 1000 to 1 attenuator. As a result, for a rotation rate sensor 10 having an operating range of ±50° per second, the predefined constant pseudo rate of rotation is approximately 25° per second when the sensor 10 is functioning properly. And, the sensor 10 is operating properly if the observed change in rate of rotation is within a 7% tolerance of the predefined 25° per second rate.

When all of the major components (i.e. the drive circuit 171, the pickup circuit 172, the test circuit 173, and the tuning fork 13) of the rotation rate sensor 10 are functioning properly, the observed change in the rate represented by the rate signal 188 will approximately equal (i.e. be within the specified tolerance of) the constant pseudo rate of rotation. However, if one or more of these components is not functioning properly, the observed change in rate will be substantially less than (i.e. not within the specified tolerance of) the constant pseudo rate of rotation.

Furthermore, the location of the leads 114, 128, 137, and 149 on the suspension bridges 64–67 provides a unique way to determine during the test mode if any of the bridges 64–67 of the tuning fork 13 has broken. If any of the bridges 64–67 has broken, then the corresponding lead 114, 128, 137, or 149 disposed on the broken bridge will be severed. As a result, a user can compare the observed change in the rate represented by the rate signal 188 during the test mode with the guideline value discussed above to determine if a bridge has broken.

Figure 6:
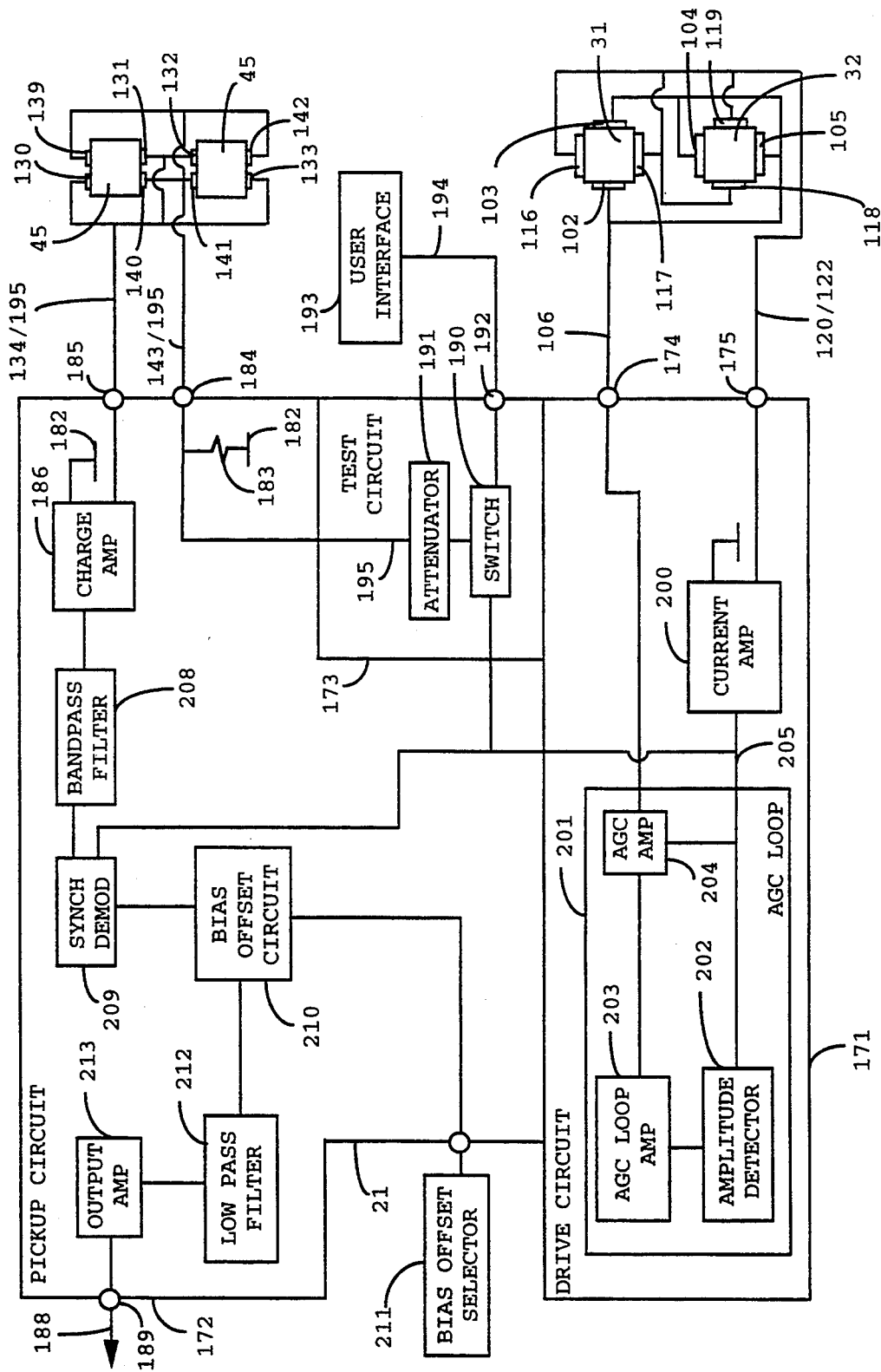
FIG. 6 is another diagram of the rotation rate sensing circuit shown in FIG. 1.

FIG. 6 shows another embodiment of the rotation rate sensor 10. In this case, the output terminal of the current amplifier 200 is coupled to the switch 190. Thus, the attenuator 191 attenuates the current signal 205 to generate the test signal 195. Since the current of the current signal 205 is proportional to the amplitude of vibration of the drive tines 31 and 32, so is the current of the test signal 195.

Alternatively, the switch 190 and the attenuator 191 can be switched. In this configuration, the input of the attenuator 191 will be coupled to the output terminal of the current amplifier 200 and the output of the attenuator 191 will be coupled to one of the inputs of the switch 190.

The configuration of FIG. 5 is distinguishable from the configuration of FIG. 6 in that the test signal 195 of FIG. 5 has a voltage which is proportional to this amplitude of vibration. Therefore, when it is desired that test signal 195 have a current rather than a voltage proportional to the amplitude of vibration, the appropriate configuration to use is that shown in FIG. 6 instead of the one shown in FIG. 5. Otherwise, the operation and the configuration of these two embodiments for rotation rate sensor 10 is the same.

Furthermore, in an alternative configuration to those shown in FIGS. 5 and 6, the switch 190 can be eliminated. As a result, the attenuator 191 is directly coupled to the output terminal 174 of the drive circuit 171, as in FIG. 5, or is directly coupled to the output terminal of the charge amplifier 200, as in FIG. 6.

In this configuration, the pickup circuit will always receive the test signal 195 together with the rotation signal 134. The user can then control the bias offset circuit 210 to trim (i.e. offset) the demodulated signal output by the demodulation electronics 209 so that it has a predefined amount of bias due to the test signal 134. As a result, the rate signal 188 put out by the output amplifier 213 of the pickup circuit 172 will correspond to the sum of the actual rate of rotation and the predefined bias. In other words, the rate signal 188 will have a component that corresponds to the actual rate of rotation and a constant component that corresponds to the predefined bias.

In this configuration, when the actual rate of rotation is zero, the rate signal 188 will represent only the predefined bias due to the test signal 195. Thus, if at this zero rate of rotation, the rate signal 188 does not correspond to the predefined bias amount, then the user knows that the rotation rate sensor 10 is defective.

The sensing circuit 21 with the test circuit 173 is not limited to being used only with the described tuning fork 13. In particular, the sensing circuit 21 may be used with conventional double ended tuning forks which are mounted to the sensor housing with bridges located on each side of the tuning fork body. Also, the sensing circuit 21 may be used with single ended tuning forks. In fact, one skilled in the art will appreciate, that the sensing circuit 21 may be used with any piezoelectric structure which has at least one pickup high, one pickup low, one drive high, and one drive low electrode disposed on it.

Furthermore, various other embodiments for the tuning fork 13 and the rotation rate sensor 13 may exist. For example, the placement of the electrodes, leads, and contact pads on the various embodiments of tuning fork 13 may vary for different types of piezoelectric materials and/or crystallographic orientations.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a rotation rate sensing circuit for use with a piezoelectric structure which provides a rotation signal corresponding to an actual rotation of the structure:
   a test circuit for providing a test signal corresponding to a pseudo rotation of the piezoelectric structure; and
   a pickup circuit responsive to the rotation signal and the test signal for providing an output signal which corresponds to the actual rotation and the pseudo rotation of the piezoelectric structure.

2. The sensing circuit of claim 1 further comprising:
   a drive circuit for applying a drive signal to the piezoelectric structure to induce vibration of the piezoelectric structure;

the test signal being applied to the piezoelectric structure in phase with the drive signal.

3. The sensing circuit of claim 2 wherein:
the drive circuit includes means for applying a drive current to the piezoelectric structure; and
the test circuit includes means connected between the drive circuit and the pickup circuit for applying a portion of the drive current to the pickup circuit as the test signal.

4. The sensing circuit of claim 3 wherein the test circuit includes an attenuator for reducing the level of the drive current applied to the pickup circuit.

5. The sensing circuit of claim 3 wherein the test circuit includes switching means for applying the current from the drive circuit to the pickup circuit in response to a command signal.

6. The sensing circuit of claim 1 further including:
means coupled to the piezoelectric structure for picking up a drive low signal corresponding to a drive mode vibration of the structure;
means responsive to the drive low signal for generating a drive high signal; and
means for applying the drive high signal to the piezoelectric structure to cause the drive mode vibration of the structure.

7. The sensing circuit of claim 6 wherein the test circuit includes means responsive to the drive high signal for applying the test signal to the piezoelectric structure in phase with the drive high signal.

8. The sensing circuit of claim 6 further including:
a current amplifier for amplifying the drive low signal to provide a current signal; and
means in the test circuit responsive to the current signal for providing the test signal in phase with the current signal.

9. A rotation rate sensor comprising:
a piezoelectric structure;
a test circuit for providing a test signal corresponding to a pseudo rotation of the piezoelectric structure;
means for applying the test signal to the piezoelectric structure;
pickup means for picking up from the piezoelectric structure the test signal and a rotation signal which corresponds to an actual rotation of the structure; and
means responsive to the signals picked up from the piezoelectric structure for generating an output signal which corresponds to the actual rotation and the pseudo rotation of the structure.

10. The rotation rate sensor of claim 9 further comprising:
means coupled to the piezoelectric structure for picking up a drive low signal corresponding to a drive mode vibration of the structure;
a drive circuit responsive to the drive low signal for generating a drive high signal; and
means for applying the drive high signal to the piezoelectric structure to cause the drive mode of vibration of the structure.

11. The sensor of claim 10 further including:
a plurality of suspension bridges in the piezoelectric structure; and
electrically conductive leads disposed on the suspension bridges for carrying the test signal, signals picked up from the piezoelectric structure, and the drive signals;
said leads being adapted to be severed by breakage of the bridges upon which they are disposed.

12. The sensor of claim 11 further including:
means for monitoring the output signal to detect breakage of the bridges.

13. The rotation rate sensor of claim 10 wherein the test circuit includes means responsive to the high drive signal for applying the test signal to the piezoelectric structure in phase with the drive high signal.

14. The rotation rate sensor of claim 13 wherein the test circuit includes an attenuator for attenuating the drive high signal to generate the test signal.

15. The rotation rate sensor of claim 10 wherein:
the drive circuit includes a current amplifier for amplifying the drive low signal to produce a current signal; and
the test circuit includes means responsive to the current signal for providing the test signal to the piezoelectric structure in phase with the current signal.

16. The rotation rate sensor of claim 15 wherein the test circuit includes an attenuator for attenuating the current signal to generate said test signal.

17. A rotation rate sensor having a test mode and a normal mode of operation, comprising:
a piezoelectric structure;
a test circuit for providing a test signal corresponding to a pseudo rate of rotation of the piezoelectric structure;
means disposed on the piezoelectric structure for applying the test signal to the piezoelectric structure during the test mode;
pickup means disposed on the piezoelectric structure for picking up from said structure a signal which during the normal mode of operation corresponds to actual rotation of the structure and during the test mode corresponds both to actual rotation of the structure and to the pseudo rate of rotation; and
means responsive to the signal picked up from the piezoelectric structure for generating a test mode output signal which corresponds to a sum of the actual rate of rotation and the pseudo rate of rotation during the test mode and a normal mode output signal corresponding to the actual rate of rotation during the normal mode of operation.

18. The rotation rate sensor of claim 17 wherein the test circuit includes means for switching between the test mode and the normal mode of operation and for providing the test signal only during the test mode.

19. The rotation rate sensor of claim 17 further comprising:
means disposed on the piezoelectric structure for picking up a drive low signal corresponding to a drive mode vibration of the structure;
a drive circuit responsive to the drive low signal for generating a drive high signal;
means for applying the drive high signal to the piezoelectric structure to cause the drive mode vibration of said structure.

20. The rotation rate sensor of claim 19 further including:
a plurality of suspension bridges in the piezoelectric structure; and
electrically conductive leads disposed on the suspension bridges for carrying the test signal, signals picked up from the piezoelectric structure, and the drive signals, said leads being adapted to be severed by breakage of the bridges upon which they are disposed.

21. The rotation rate sensor of claim 19 wherein the test circuit includes means responsive to the drive high signal for providing the test signal in phase with the high drive signal.

22. The rotation rate sensor of claim 19 wherein:

the means for applying the test signal to the piezoelectric structure includes a pickup low terminal and a resistor coupled between the pickup low terminal and ground for applying a ground signal to the terminal;

the test circuit includes an attenuator coupled to the drive circuit for attenuating the drive signal to generate the test signal, and switching means connected between the attenuator and the pickup low terminal for applying the test signal to the pickup low terminal only during the test mode; and the means for applying the test signal to the piezoelectric structure comprises pickup low electrodes coupled to the pickup low terminal and disposed on the piezoelectric structure for applying the test signal to the structure during the test mode and for applying the ground signal to the structure during the normal mode.

23. The rotation rate sensor of claim 21 wherein:

the means for applying the test signal to the piezoelectric structure includes a pickup low terminal and a resistor coupled between the pickup low terminal and ground for providing a ground signal to the terminal;

the test circuit includes an attenuator coupled to the pickup low terminal, and switching means between the drive circuit and the attenuator for providing the signal from the drive circuit to the attenuator only during the test mode; and the means for applying the test signal to the piezoelectric structure comprises pickup low electrodes coupled to the pickup low terminal and disposed on the piezoelectric structure for applying the test signal to the structure during the test mode and for applying the ground signal to the structure during the normal mode.

24. The rotation rate sensor of claim 19 wherein:

the drive circuit includes a current amplifier for amplifying the drive low signal to produce a current signal; and the test circuit includes means responsive to the current signal for providing the test signal in phase with the current signal.

25. The rotation sensor of claim 24 wherein:

the means for applying the test signal to the piezoelectric structure includes a pickup low terminal and a resistor coupled between the pickup low terminal and ground for applying a ground signal to the terminal;

the test circuit includes an attenuator coupled to the drive circuit for attenuating the current signal to generate the test signal, and switching means connected between the attenuator and the pickup low terminal for applying the test signal to the pickup low terminal only during the test mode; and the means for applying the test signal to the piezoelectric structure comprises pickup low electrodes coupled to the pickup low terminal and disposed on the piezoelectric structure for applying the test signal to the structure during the test mode and for applying the ground signal to the structure during the normal mode.

26. The rotation rate sensor of claim 24 wherein:

the means for applying the test signal to the piezoelectric structure includes a pickup low terminal and a resistor coupled between the pickup low terminal and ground for providing a ground signal to the terminal;

the test circuit includes an attenuator coupled to the pickup low terminal, and switching means between the drive circuit and the attenuator for providing the current signal to the attenuator only during the test mode; and the means for applying the test signal to the piezoelectric structure comprises pickup low electrodes coupled to the pickup low terminal and disposed on the piezoelectric structure for applying the test signal to the structure during the test mode and for applying the ground signal to the structure during the normal mode.

27. A sensor comprising:

a piezoelectric structure;

a test circuit for providing a test signal corresponding to a pseudo deflection of the piezoelectric structure;

means coupled to the test circuit for applying the test signal to the piezoelectric structure;

pickup means for picking up from the structure the test signal and a signal corresponding to an actual deflection of the structure; and means responsive to the test signal and the signal corresponding to actual deflection for generating an output signal corresponding to the actual and pseudo deflections of the piezoelectric structure.

28. The sensor of claim 27 wherein:

the piezoelectric structure is vibratory;

the test signal corresponds to a pseudo vibration of the piezoelectric structure;

the actual deflection signal corresponds to an actual vibration of the piezoelectric structure; and the output signal corresponds to the actual and pseudo vibrations of the piezoelectric structure.

29. The sensor of claim 27 further comprising:

a drive circuit for generating a drive signal; and drive electrodes coupled to the drive circuit and disposed on the piezoelectric structure for applying the drive signal to the piezoelectric structure to induce drive mode deflection of the structure;

the test circuit including means responsive to the drive signal for providing the test signal in phase with the drive signal.

30. The sensor of claim 29 wherein:

the test circuit includes an attenuator for attenuating the drive signal to generate the test signal; and the means for applying the test signal to the piezoelectric structure comprises electrodes coupled to the attenuator and disposed on the piezoelectric structure for applying the test signal to the structure.

31. The sensor of claim 27 further comprising:

a drive circuit for generating a drive high signal;

drive high electrodes coupled to the drive circuit and disposed on the piezoelectric structure for applying the drive high signal to the structure to induce drive mode deflection of the structure; and drive low electrodes for picking up a drive low signal from the piezoelectric structure corresponding to the induced drive mode deflection;

the drive circuit including a current amplifier coupled to the drive low electrodes for amplifying the drive low signal to produce a current signal; and the test circuit including means responsive to the current signal for providing the test signal in phase with the current signal.

32. The sensor of claim 31 wherein:
the test circuit includes an attenuator for attenuating the current signal to generate the test signal; and
the means for applying the test signal to the piezoelectric structure comprises electrodes coupled to the attenuator and disposed on the structure.

33. A sensor having a test mode and a normal mode of operation, the sensor comprising:
a piezoelectric structure;
a test circuit for providing a test signal corresponding to a pseudo rate of deflection of the piezoelectric structure;
means coupled to the test circuit for applying the test signal to the piezoelectric structure during the test mode;
pickup means disposed on the piezoelectric structure for picking up from said structure a signal which during the normal mode of operation corresponds to an actual rate of deflection of the structure and during the test mode corresponds both to the actual rate of deflection of the structure and to the pseudo rate of deflection; and
means responsive to the signal picked up from the piezoelectric structure for generating a test mode output signal which corresponds to a sum of the actual rate of deflection and the pseudo rate of deflection during the test mode and a normal output signal corresponding to the actual rate of deflection during the normal mode of operation.

34. The sensor of claim 33 wherein the test circuit includes means for switching between the test and normal modes and for providing the test signal only during the test mode.

35. The sensor of claim 33 wherein
the piezoelectric structure is vibratory;
the test signal corresponds to a pseudo vibration of the piezoelectric structure;
the actual deflection signal corresponds to an actual vibration of the piezoelectric structure; and
the output signal corresponds to a sum of actual and pseudo vibrations of the piezoelectric structure.

36. The sensor of claim 35 further comprising:
a drive circuit for generating a drive signal; and
drive electrodes coupled to the drive circuit and disposed on the piezoelectric structure for applying the drive signal to the structure to induce drive mode vibration of the structure;
the test circuit including means responsive to the drive signal for providing the test signal in phase with the drive signal.

37. The sensor of claim 36 wherein:
the means for applying the test signal to the piezoelectric structure includes a pickup low terminal and a resistor coupled between the pickup low terminal and ground for applying a ground signal to the terminal;
the test circuit includes an attenuator coupled to the drive circuit for attenuating the drive signal to generate the test signal, and switching means connected between the attenuator and the pickup low terminal for applying the test signal to the pickup low terminal only during the test mode; and
the means for applying the test signal to the piezoelectric structure comprises pickup low electrodes coupled to the pickup low terminal and disposed on the piezoelectric structure for applying the test signal to the structure during the test mode and for applying the ground signal to the structure during the normal mode.

38. The rotation rate sensor of claim 36 wherein:
the means for applying the test signal to the piezoelectric structure includes a pickup low terminal and a resistor coupled between the pickup low terminal and ground for providing a ground signal to the terminal;
the test circuit includes an attenuator coupled to the pickup low terminal, and switching means between the drive circuit and the attenuator for providing the signal from the drive circuit to the attenuator only during the test mode; and the means for applying the test signal to the piezoelectric structure comprises pickup low electrodes coupled to the pickup low terminal and disposed on the piezoelectric structure for applying the test signal to the structure during the test mode and for applying the ground signal to the structure during the normal mode.

39. The sensor of claim 35 further comprising:
a drive circuit for generating a drive high signal;
drive high electrodes coupled to the drive circuit and disposed on the piezoelectric structure for applying the drive high signal to the structure to induce drive mode vibration of the structure; and
drive low electrodes disposed on the piezoelectric structure for picking up a drive low signal from the structure corresponding to the induced drive mode vibration;
the drive circuit including a current amplifier coupled to the drive low electrodes for amplifying the drive low signal to produce a current signal; and
the test circuit including means responsive to the current signal for providing the test signal in phase with the current signal.

40. The sensor of claim 39 wherein:
the means for applying the test signal to the piezoelectric structure includes a pickup low terminal and a resistor coupled between the pickup low terminal and ground for applying a ground signal to the terminal;
the test circuit includes an attenuator coupled to the drive circuit for attenuating the current signal to generate the test signal, and switching means connected between the attenuator and the pickup low terminal for applying the test signal to the pickup low terminal only during the test mode; and
the means for applying the test signal to the piezoelectric structure comprises pickup low electrodes coupled to the pickup low terminal and disposed on the piezoelectric structure for applying the test signal to the structure during the test mode and for applying the ground signal to the structure during the normal mode.

41. The sensor of claim 39 wherein:
the means for applying the test signal to the piezoelectric structure includes a pickup low terminal and a resistor coupled between the pickup low terminal and ground for providing a ground signal to the terminal;
the test circuit includes an attenuator coupled to the pickup low terminal, and switching means between the drive circuit and the attenuator for providing the current signal to the attenuator only during the test mode; and the means for applying the test signal to the piezoelectric structure comprises pickup low electrodes coupled to the pickup low terminal and disposed on the piezoelectric structure for applying the test signal to the structure during the test mode and for applying the ground signal to the structure during the normal mode.

42. A sensor comprising:

a vibratory element which provides a signal corresponding to an actual deflection of the element;

a test circuit for providing a test signal corresponding to a pseudo deflection of the vibratory element; and means responsive to the signal corresponding to the actual deflection and to the test signal for providing an output signal corresponding to the actual deflection and the pseudo deflection.

43. The sensor of claim 42 further including:

means for applying a drive signal to the vibratory element to produce drive mode vibration of the element; and means in the test circuit responsive to the drive signal for providing the test signal in phase with the drive signal.

44. The sensor of claim 42 further including:

means coupled to the vibratory element for picking up a drive low signal corresponding to a drive mode vibration of said element;

means responsive to the drive low signal for providing a drive high signal; and means for applying the drive high signal to the vibratory element to cause the drive mode vibration of the element.

45. The sensor of claim 44 wherein the test circuit includes means responsive to the drive high signal for providing the test signal in phase with the drive high signal.

46. The sensor of claim 44 wherein the test circuit includes an attenuator for attenuating the drive high signal to provide the test signal.

47. The sensor of claim 44 further including:

a current amplifier for amplifying the drive low signal to produce a current signal; and means responsive to the current signal for providing the test signal in phase with the current signal.

48. The sensor of claim 47 wherein the test circuit includes means for attenuating the current signal to produce the test signal.

49. The sensor of claim 44 wherein the means for providing the drive high signal includes an amplifier with automatic gain control.

* * * * *